United States Patent [19]

Haldenwanger et al.

[11] Patent Number: 5,178,036
[45] Date of Patent: Jan. 12, 1993

[54] STEERING WHEEL

[75] Inventors: Hans G. Haldenwanger, Ingolstadt; Herwig Reim, Buxheim; Klaus Bieber, Gaimersheim; Harmut Kersten, Ingolstadt; Klaus Grothe, Oberursel; Martin Kreuzer, Kleinwallstadt; Peter Hartmann, Waldaschaff, all of Fed. Rep. of Germany

[73] Assignees: Kolbenschmidt Aktiengesellschaft, Neckarsulm; Audi Aktiengesellschaft, Ingolstadt, both of Fed. Rep. of Germany

[21] Appl. No.: 769,150

[22] Filed: Sep. 27, 1991

Related U.S. Application Data

[63] Continuation of Ser. No. 485,802, Feb. 26, 1990, abandoned, which is a continuation of Ser. No. 76,563, Jul. 22, 1987, abandoned.

[30] Foreign Application Priority Data

Jul. 26, 1986 [DE] Fed. Rep. of Germany ....... 3625372

[51] Int. Cl.$^5$ .............................................. G05G 1/10
[52] U.S. Cl. .................................... 74/552; 428/325
[58] Field of Search .................. 74/552; 428/327, 325

[56] References Cited

U.S. PATENT DOCUMENTS

| | | | |
|---|---|---|---|
| 1,569,888 | 1/1926 | Sheller | 74/552 |
| 2,041,739 | 5/1936 | Beck | 74/552 |
| 3,456,526 | 7/1969 | Brilmyer | 74/552 |
| 3,930,420 | 11/1976 | Kizu et al. | 74/552 |
| 4,061,054 | 12/1977 | Wenninger | 74/552 |
| 4,118,455 | 10/1978 | Byrn | 74/552 X |
| 4,201,830 | 5/1980 | Wollen | 74/552 X |
| 4,468,978 | 9/1984 | Takahara et al. | 74/552 |
| 4,542,166 | 9/1985 | Mabuchi | 74/552 X |
| 4,579,775 | 4/1986 | Ohta et al. | 74/552 X |
| 4,581,408 | 4/1986 | Trabert et al. | 525/66 |
| 4,584,900 | 4/1986 | Masuda | 74/558 X |
| 4,627,307 | 12/1986 | Yamazawa et al. | 74/552 |
| 4,633,734 | 1/1987 | Yano et al. | 74/552 |
| 4,635,500 | 1/1987 | Overcashier et al. | 74/552 |
| 4,640,150 | 2/1987 | Kobayashi et al. | 74/552 |
| 4,673,451 | 6/1987 | Yamazawa et al. | 74/552 X |
| 4,811,472 | 3/1989 | Kobayashi | 74/552 X |

FOREIGN PATENT DOCUMENTS

| | | | |
|---|---|---|---|
| 50309 | 4/1982 | European Pat. Off. | 74/552 |
| 146959 | 7/1985 | European Pat. Off. | 74/552 |
| 0255171 | 7/1987 | European Pat. Off. | |
| 7531072 | 2/1976 | Fed. Rep. of Germany | |
| 2714959 | 10/1978 | Fed. Rep. of Germany | 74/552 |
| 59-109460 | 6/1984 | Japan | 74/552 |
| 59-120568 | 7/1984 | Japan | 74/552 |
| 60-50069 | 3/1985 | Japan | 74/552 |
| 61-64576 | 4/1986 | Japan | 74/552 |
| 61-71273 | 4/1986 | Japan | 74/552 |
| 262340 | 12/1926 | United Kingdom | 74/552 |
| 1571902 | 7/1980 | United Kingdom | 74/552 |
| 2041858 | 9/1980 | United Kingdom | 74/552 |
| 1582846 | 1/1981 | United Kingdom | 74/552 |
| 2061848 | 5/1981 | United Kingdom | 74/552 |

Primary Examiner—Rodney M. Lindsey
Attorney, Agent, or Firm—Spring Horn Kramer & Woods

[57] ABSTRACT

The hub and spoked of a steering wheel consist of a synthetic thermoplastic resin and just as the rim are covered with a layer of a deformable plastic. To provide a steering wheel which is light in weight and has a high temperature stability, the hub and spokes consist of a polyamide which has been modified with elastomers and fibers.

6 Claims, 3 Drawing Sheets

STEERING WHEEL

This application is a continuation, of application Ser. No. 07/485,802, filed Feb. 26, 1990 which is a continuation of application Ser. No. 076,563, filed Jul. 22, 1987 and now both abandoned.

BACKGROUND OF THE INVENTION

This invention relates to a steering wheel, in which the hub and spokes are made of synthetic thermoplastic material and just like the rim are covered with a layer of a deformable plastic material.

Such a steering wheel is known, e.g., from German Utility Model 75 31 072 and is much lighter in weight than a conventional steering wheel having a metal skeleton. A decrease in the weight of components of motor vehicles will reduce the fuel consumption so that energy can be saved. Besides, a steering wheel which is lighter in weight represents a smaller mass which is capable of oscillation or rotation so that a more desirable vibratory behavior will be obtained as is desired by the higher comfort requirements. But steering wheels made of thermoplastic material have the disadvantage that they do not entirely comply with the high requirements to be met as regards temperature-stable stiffness, strength and impact strengths, particularly as far as the rim of the steering wheel is concerned. It is also difficult to ensure that the torques which are exerted on the rim of the steering wheel for a steering movement will reliably be transmitted via the hub to the steering column.

For this reason the manufacturers of steering wheels face the object to develop a steering wheel which is light in weight and complies with the requirements of modern motor vehicle engineering. But a saving in weight must not impair the reliability in operation.

SUMMARY OF THE INVENTION

That object is accomplished by the provision of a steering wheel in which the hub and the spokes consist of a composite polyamide which has been modified with 10 to 25% by weight elastomers and 30 to 50% by weight fibers, based on the total weight of the composite, and the rim of the steering wheel consists in dependence on the desired mass moment of inertia of steel or light alloy or of wound continuous glass filaments embedded in plastic material. In such a steering wheel an optimum relationship of weight decrease, comfortable handling and reliability in operation can be achieved, i.e., because the rotatable mass (mass moment of inertia) can be varied and the elastomer will ensure that the plastic parts will be capable of plastic deformation in case of an accident even at sub-freezing temperatures because the low-temperature impact strength has been increased.

The elastomer suitably consists of one or more of the substances EPM, EPDM, polyethylene, butadiene and natural rubber. EPM is a saturated ethylene-propylene rubber. EPDM is an unsaturated ethylene-propylene rubber which contains dienes as a tercomponent. The fibers may consist of glass fibers, aramid fibers, carbon fibers or whiskers.

Various designs may be adopted for the rim of the steering wheel. The materials mentioned above may be used. The light alloy may consist, e.g., of an aluminum alloy. The rim of the steering wheel may be solid in cross-section or may have in cross-section the shape of a tube having any of various profiled shapes, which may be rectangular, square, polygonal, trapezoidal etc. The results of tests suggest that it will be recommendable to use such a design that mass moments of inertia in the range from about $2 \times 10^{-2}$ to $4 \times 10^{-2}$ kg m$^2$ (200 to 400 kg cm$^2$) will be obtained, in dependence on the type of the vehicle. The optimum value will depend on the technical properties of the motor vehicle and should be so selected that the vertical oscillations of the steering wheel and other vibrations will be minimized and when the steering wheel has been turned, e.g., for a cornering of the vehicle, the steering wheel can be turned back to the zero position in an optimum manner without an overswing. Owing to such an optimization it may be possible to omit the steering damper which is usually required to suppress rotary oscillations. If the rim of the steering wheel comprises a fiber-containing composite material, it will be recommendable to embed the continuous glass filaments in a plastic matrix consisting of epoxide, vinyl ester or polyester resins. A fiber content in the range from 60 to 80% by weight, preferably of about 75% by weight, based on the total weight of the composite, is recommendable. The manufacture is preferably performed by an endless winding of unidirectional fibers.

To improve the flexural strength of the spokes, they have in cross-section preferably the shape of a U which is open on the side facing the steering column and are reinforced by ribs extending at an angle of 45° to the direction-of-travel axis. That design will result in optimum torsional and flexural stiffness values. In case of an accident, the highest load will be a compressive load in the legs of the U-shaped cross-section so that said legs will buckle under an excessive load and energy will be transformed into work of deformation. The reinforcing ribs are so arranged that the same flexural stress will be obtained at all points.

From the aspect of safety, the rim, the spokes and the hub of the steering wheel are suitably covered with polyurethane foam.

If the steering column is formed with splines at its top end, it will be desirable for the transmission of torques to embed in the plastic hub a metal member which is adapted to be slidably fitted on the steering column. That metal member is suitably utilized for conducting current to be supplied to or from the horn switch that is incorporated in the steering wheel.

The steering wheel embodying the invention is illustrated by way of example in the drawing and will be explained more in detail hereinafter.

BRIEF DESCRIPTION OF THE DRAWING

The FIG. 1 is a cross section of a steering wheel according to the invention.

DETAILED DESCRIPTION OF THE INVENTION

Figure 1:
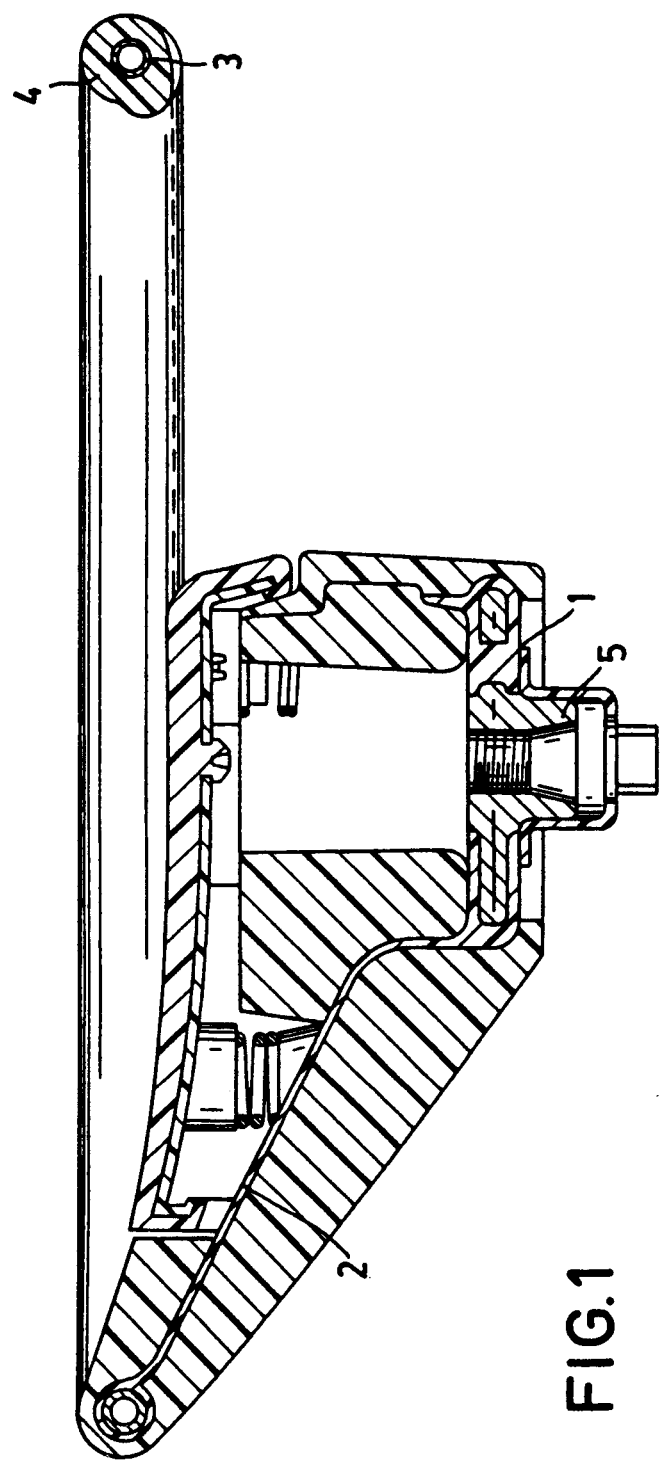
Figure 2:
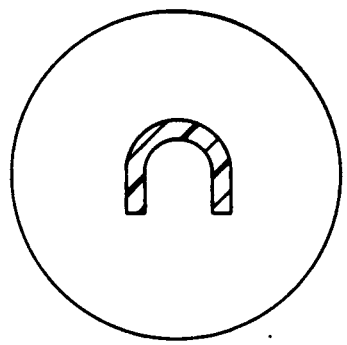
FIGS. 2, 3, 4, 5, 6, 7 and 8 alternate cross sections of the rim of the steering wheel of FIG. 1.
Figure 3:
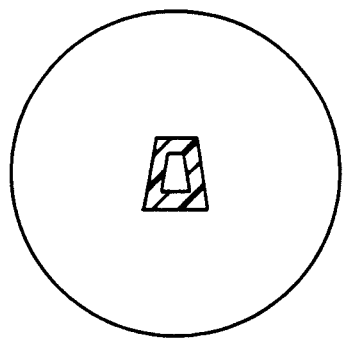
Figure 4:
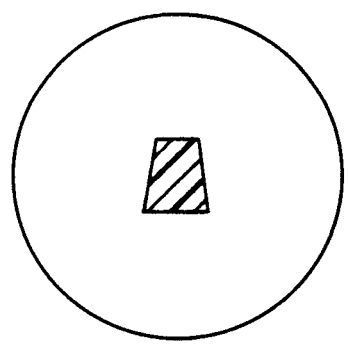
Figure 5:
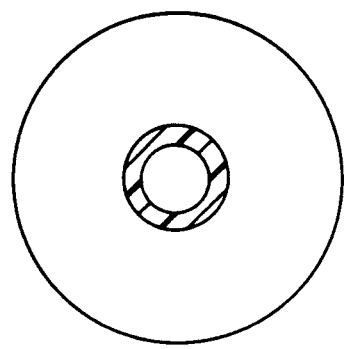
Figure 6:
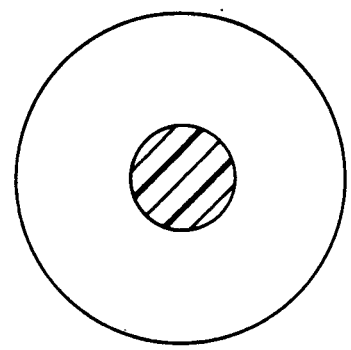
Figure 7:
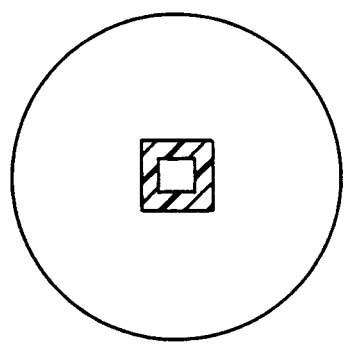
Figure 8:
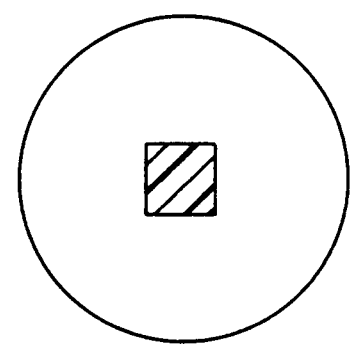

In a preferred embodiment of the steering wheel, which is shown in cross-section, the hub 1 and the spokes 2 consist of composite polyamide, which contains 20% by weight elastomer and 40% by weight glass fibers, based on the total weight of the composite. The hub 1 and the spokes 2 have been injection-molded in an operation which the spokes have been molded around a tubular steel rim 3 of the steering wheel. The rim 3 may be solid or tubular in cross section and can have a U-shape, a trapezoidal shape, a square shape or a circular shape in cross section as shown in FIGS. 2-8. The hub 1, the spokes 2 and the rim 3 of the steering wheel have subsequently been covered with a polyurethane foam layer 4, which is capable of plastic deformation. A metal member 5, which is adapted to be slidably fitted on the steering column, is embedded in the hub 1. The modified polyamide 1, 2 has the following mechanical-technological properties which are relevant for a steering wheel:

| Approximate Technical Data at 23° in a Dry State | | |
| --- | --- | --- |
| Property | Unit | Value |
| Ultimate tensile stress | Nmm$^{-2}$ | 166 |
| Elongation at break | % | 6.4 |
| Modulus of elasticity (in tension) | Nmm$^{-2}$ | 10,680 |
| Impact strength | KJm$^{-2}$ | 79 |
| Izod notched impact strength (A) | Jm$^{-1}$ | 253 |
| Fracture energy W$_{50}$ | Nm +23° C. | 24 |
| (1.5 mm test specimen) | −20° C. | 9 |
|  | −40° C. | 6 |
| Density | gcm$^{-3}$ | 1.41 |
| Shrinkage | longitudinal, % | 0.3 |
| (test specimen 1.5 mm, mold temperature 60°) | transverse, % | 0.4 |
| Processing temperature range | °C. | 280–300 |
| Linear coefficient of expansion | K$^{-1}$ × 10$^{-5}$ | 1–2 |

What is claimed is:

1. A steering wheel comprising a rim, a hub, spokes, and a layer of a deformable polyurethane foam covering the hub, spokes and rim wherein the spokes have in cross-section the shape of a U which is open on the side facing a steering column and are reinforced by a network of ribs and wherein the hub and the spokes consist of a composite consisting of a synthetic thermoplastic material based on polyamide which has been modified with 10 to 25% by weight of an elastomer consisting of one or more of the materials EPM, EPDM, polyethylene, butadiene or natural rubber and 30 to 50% by weight fibers, consisting of glass fibers, aramid fibers, carbon fibers or whiskers based on the total weight of the composite, and the rim of the steering wheel comprising steel or light alloy or wound continuous glass filaments embedded in a second plastic material in dependence on a selected mass of inertia.

2. A steering wheel according to claim 1, wherein a metal member, which is adapted to be slidably fitted on a steering column, is embedded in the hub and serves to transmit torque and is adapted to conduct electric current to or from a horn.

3. A steering wheel according to claim 1, wherein the rim of the steering wheel is solid or tubular in cross-section and has a rectangular, trapezoidal or polygonal shape in cross-section.

4. A steering wheel according to claim 1, wherein the hub and the spokes comprise a composite polyamide which has been modified with 20% by weight of said elastomer and 40% by weight of said fibers, based on the total weight of the composite, and wherein said fibers are glass fibers.

5. A steering wheel according to claim 1, wherein the rim of the steering wheel comprises wound endless glass filaments embedded in a second plastic material and has a filament content from 60 to 80% by weight and the second plastic material comprises an epoxide or vinyl ester resin.

6. A steering wheel according to claim 5, wherein the filament content is 75% by weight.

* * * * *